UNITED STATES PATENT OFFICE.

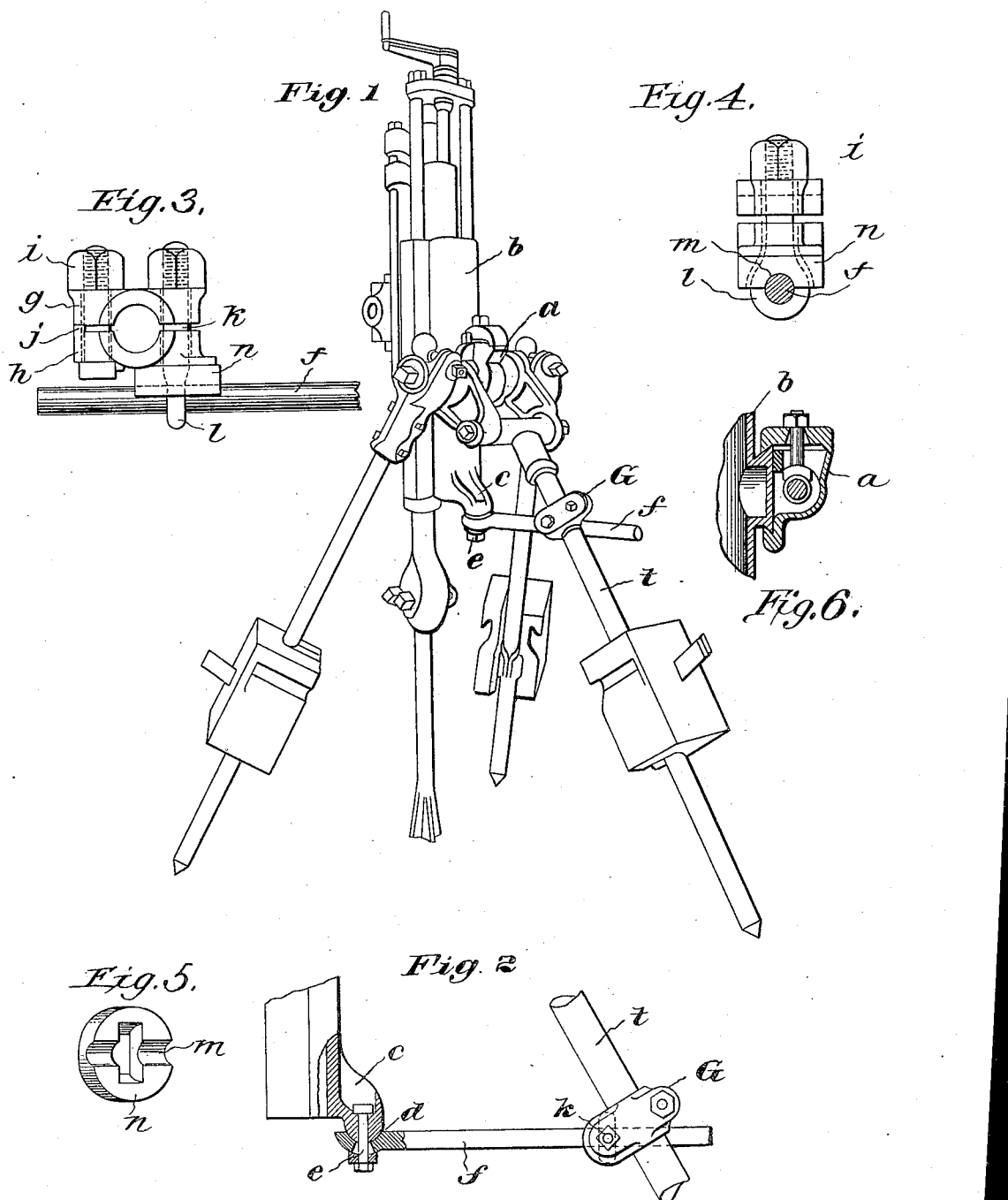

ALBERT BALL, OF CLAREMONT, NEW HAMPSHIRE, ASSIGNOR TO SULLIVAN MACHINERY COMPANY, OF CLAREMONT, NEW HAMPSHIRE, A CORPORATION OF MAINE.

DRILL-SUPPORT.

No. 887,301.    Specification of Letters Patent.    Patented May 12, 1908.

Application filed July 28, 1904. Serial No. 218,480.

*To all whom it may concern:*

Be it known that I, ALBERT BALL, a citizen of the United States, residing at Claremont, in the county of Sullivan and State of New Hampshire, have invented an Improvement in Drill-Supports, of which the following description, in connection with the accompanying drawings, is a specification, like letters on the drawings representing like parts.

My invention relates to improvements in drill supports, particularly intended for application to rock drills for the purpose of giving greater rigidity to the supporting structure thereof and maintaining the selected alinement of the drill support with the work at all times, and particularly on heavy work or high power drills where the severity of the work often causes the drill support or the drill on its support to spring or yield during use.

My invention will be best understood from the following description taken in connection with the accompanying illustration of one specific embodiment thereof; while its scope will be more particularly pointed out in the appended claims.

In the drawings,—Figure 1 is a view showing the application of one form of my invention to a tripod supported rock drill; Fig. 2 is a detail referring to the same; and, Figs. 3, 4 and 5 are details.

In the drawings, and referring particularly to Fig. 1, the tripod is surmounted by the usual form of saddle *a* to which is adjustably secured the shell *b* carrying the engine cylinder the connection of the shell to the saddle and the connection of the latter to its supporting legs being in all substantial respects similar to that shown in my prior patent No. 471,300 dated March 22, 1892, and being such as to permit a universal adjustment of the two side legs. The drill and the associated parts are as usual in this class of apparatus. At the lower end of the depending shell *b* is provided a bracket *c* having (Fig. 2) the spherical tip *d* against which is clamped, by means of the bolt *e* the cup-shaped end of the stay rod *f*. By unloosening the nut which secures the bolt *e* the stay rod may be moved about the spherical end of the bracket to assume, within suitable limits, any desired position thereupon, the cup-shaped end of the rod being cut away where the bolt passes through the same to permit this adjustment. The opposite end of the stay rod is carried to, and rigidly held by a two part clamp G, the details of which are shown in Figs. 3, 4 and 5. Said clamp G comprises the two clamping blocks *g* and *h*, which embrace a leg *t* of the tripod. After being applied to the leg *t* the clamping bolt *i* is set up slightly to draw the shoulder *j* upon the block *h* towards the block *g* and the clamp is positioned on the tripod leg. The blocks are finally and firmly clamped upon the tripod leg by means of the clamping bolt *k*, the end of which is provided with an eye *l* adapted to receive the end of the stay rod *f* and to clamp the same in a semi-circular groove *m* cut across the face of the washer *n*. The washer is suitably cut away to receive the enlarged end of the eye, with suitable clearance as shown in Fig. 5, and the hole bored through the two blocks receiving the eye bolt *k* is suitably formed to permit a swiveled movement of the eye bolt with the washer and rod when the clamping nut is unloosened.

Referring again to Fig. 1, after the drill has been set in position it is adjusted as usual about its saddle to any desired inclination, after which the stay rod is clamped in position as described. The drill shell is then securely locked against displacement, for it is not only held at the saddle as usual but the depending shell is rigidly tied by said rod *f* to the tripod leg *t*. When it is desired to readjust the drill, the shell may be freely raised or lowered or swung in any desired direction by loosening the bolt *e* upon the bracket *d* and the two clamping bolts *i* and *k*. The unloosening of the latter permits the rod *f* to freely slide through the eye bolt and also permits swiveled movement of the latter. When the drill has been adjusted to its new position, the tightening of the three bolts again places it in condition for use. It is to be observed that the movement of the clamping bolt *k* not only rigidly secures the clamp upon the leg, but at the same time also fixedly secures the stay rod *f* to the clamp.

It will be obvious that while I have herein shown the drill shell braced by connection to one tripod leg only, the same may be braced or stayed by connection to any or all of the supporting legs or members employed.

It will be understood that I have here described one specific form of my invention only and that the same is susceptible of extensive modification within the terms of the claims from the form herein illustrated without departing from the spirit thereof.

Claim.

1. The combination of supporting legs and means to connect them at their upper ends, a drilling machine supported on said legs, a bracket projecting from the drilling machine and terminating in a sperical tip, a stay-rod having a cup-shaped end applied to said spherical tip and adjustably connected therewith, and a clamping device applied to one of the legs and performing the double function of fixing the adjustment of the stay-rod within the clamp and fixing itself in an adjusted position on the leg.

2. The combination of supporting legs, a saddle to connect their upper ends, a drilling machine including a shell secured to said saddle, a bracket projecting from said shell and having a rounded tip, a stay-rod adjustably fitted to said rounded tip and extending toward one of the legs, and a clamping device adjustably applied to said leg and engaging the said stay-rod, and means for conjointly fixing the adjustment of the clamp upon the leg and the adjustment of the stay-rod in the clamp.

3. The combination of supporting legs, a saddle to connect their upper ends, a drilling machine including a shell secured to said saddle, a bracket projecting from said shell and having a rounded tip, a stay-rod having a cup-shaped end, a bolt for adjustably connecting the bracket and cup-shaped end of the stay-rod, and a clamping device adjustably applied to a leg and engaging the said stay-rod, and means for conjointly fixing the adjustment of the clamp upon the leg and the adjustment of the stay-rod in the clamp.

4. In a device of the character described, the combination with a plurality of supporting legs, of a saddle connecting their upper ends, each leg being pivotally secured to the saddle for outward swinging adjustment relatively thereto, a drilling machine including a drill shell, the latter adjustably secured to said saddle and presenting a downwardly directed tool between the several supporting legs, a stay-rod secured to the drilling machine and adjustably applied to one of the legs to maintain the drilling machine in firm alinement between the drill tool and the said saddle, while permitting the ready adjustment of the drilling machine and the several supporting legs relatively to the saddle.

In testimony whereof, I have signed my name to this specification, in the presence of two subscribing witnesses.

ALBERT BALL.

Witnesses:
JAMES A. BRUCE,
DAVID P. FLETCHER.